(12) United States Patent
Nakagawa et al.

(10) Patent No.: US 7,157,870 B2
(45) Date of Patent: Jan. 2, 2007

(54) DRIVE METHOD FOR BRUSHLESS MOTOR AND DRIVE CONTROL APPARATUS THEREFOR

(75) Inventors: Akihiro Nakagawa, Tokyo (JP); Jun Suzumura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/311,332

(22) Filed: Dec. 20, 2005

(65) Prior Publication Data

US 2006/0261767 A1    Nov. 23, 2006

(30) Foreign Application Priority Data

May 18, 2005  (JP)  ............................ P2005-145428

(51) Int. Cl.
*H02P 6/08* (2006.01)
(52) U.S. Cl. ........................................ 318/254; 318/721
(58) Field of Classification Search ................ 318/138, 318/254, 437, 439, 609–610, 720–724; 180/6.3
See application file for complete search history.

(56) References Cited

U.S. PATENT DOCUMENTS

| | | | | |
|---|---|---|---|---|
| 6,541,939 B1 * | 4/2003 | Kishibe et al. | ............. | 318/799 |
| 6,803,739 B1 * | 10/2004 | Miyata et al. | ............. | 318/700 |
| 6,836,090 B1 * | 12/2004 | Sugiyama et al. | ........... | 318/437 |
| 6,984,948 B1 * | 1/2006 | Nakata et al. | ............. | 318/254 |
| 6,995,679 B1 * | 2/2006 | Eskritt et al. | ............. | 340/686.1 |

FOREIGN PATENT DOCUMENTS

| | | |
|---|---|---|
| JP | 7-337067 A | 12/1995 |
| JP | 10-70894 A | 3/1998 |

\* cited by examiner

*Primary Examiner*—Bentsu Ro
(74) *Attorney, Agent, or Firm*—Sughrue Mion, PLLC

(57) ABSTRACT

A drive method for a brushless motor and a drive control apparatus therefor, in which control parameters are calculated by motor current control means (74 in FIG. 2) in accordance with the deviation between a target motor current value and an actual motor current value, a manipulated variable is computed by phase control means (76) on the basis of the calculated control parameters, an advance angle magnitude is computed from the relationship between a manipulated variable and an advance angle magnitude as designed and created beforehand, on the basis of the computed manipulated variable, and the value of the conduction phase angle of a drive circuit (72) as set on the basis of a motor current signal is corrected with the information of the computed advance angle magnitude.

9 Claims, 3 Drawing Sheets

DRIVE METHOD FOR BRUSHLESS MOTOR AND DRIVE CONTROL APPARATUS THEREFOR

BACKGROUND OF THE INVENTION

1. Field of the Invention

This invention relates to a drive method for a brushless motor and a drive control apparatus therefor. More particularly, it relates to a drive method for a brushless motor and a drive control apparatus therefor as are well suited for application to a hydraulic type power steering control system employing the brushless motor.

This application is an application relevant to U.S. patent application Ser. No. 11/311,313 filed on Dec. 20, 2005 (corresponding Japanese Patent Application: Application No. JP2005-145429 filed on May 18, 2005) by the same inventors as in this application.

2. Description of the Related Art

In recent years, power steering control systems each of which assists the driver of a vehicle in handle manipulation have been often used for the steerability and stability of the driver of the vehicle. The power steering control systems include an electric type and a hydraulic type. As compared with the hydraulic type, the electric type has such merits that assist characteristics which support the driver can be freely set at the time of design, that the versatility of the control system is high, and that the fuel consumption of the vehicle is enhanced. On the other hand, however, the electric type has problems in the steerability and an environmental immunity including heat or noise.

Especially in a large-sized vehicle, therefore, the hydraulic type power steering control system is often adopted. A brushless motor is adopted for the hydraulic type power steering control system. In the hydraulic type power steering control system employing the brushless motor, a hydraulic pump is driven by the brushless motor, and a predetermined assist force as designed can be realized by a controlled hydraulic pressure in accordance with a vehicle running condition such as a vehicle speed or a steering angle rate.

In general, the hydraulic type power steering control system adopting the brushless motor stores the relationship between the vehicle speed or the steering angle rate and the designed revolution number of the brushless motor, in the microcomputer (hereinbelow, termed "memory") of the control system beforehand. Besides, the revolution number of the brushless motor is detected by a sensor for detecting the motor rotation position of the brushless motor, the deviation between the actual revolution number detected and the target revolution number stored in the memory is calculated, and the revolution number of the brushless motor is controlled so that the value of the deviation may become, at most, a predetermined value as designed, whereby the assist force required by the driver is obtained. Such a control technique is partly disclosed in, for example, JP-A-10-70894.

Also, JP-A-7-337067 states the fact that the conduction phase angle of a motor drive circuit is controlled on the basis of the revolution number and current of the brushless motor.

With the prior-art control technique disclosed in JP-A-10-70894, the drive timing (hereinbelow, termed "conduction phase angle") of the pulse width modulation (hereinbelow, abbreviated to "PWM") signal of a drive circuit for driving the brushless motor is set at a fixed angle. Accordingly, no special problem occurs in the brushless motor in the state where it revolves at a constant speed. However, in a case where a variable speed is required, there is such a problem that a region in which an efficiency lowers or a consumed current increases appears.

Besides, it is disclosed in JP-A-7-337067 that the conduction phase angle of the drive circuit for the brushless motor is controlled on the basis of the revolution number and current of the brushless motor. Thus, advantages such as the enhancement of an efficiency and the decrease of a consumed current are noted in a steady running state at a predetermined revolution number. In order to perform a control in a wider range of revolution numbers, however, the responsibility of the conduction phase angle of PWM needs to be heightened.

SUMMARY OF THE INVENTION

This invention has been made in order to solve the problems of the prior-art control techniques as stated above, and has for its object to provide a drive method for a brushless motor and a drive control apparatus therefor as can attain the high efficiency of the brushless motor and decrease the consumption current thereof especially in a low-speed revolution region and a high-load region.

Another object of the invention is to provide a drive method for a brushless motor and a drive control apparatus therefor as are well suited for application to a hydraulic type power steering system which employs the brushless motor for driving an electrically-operated pump.

A drive method for a brushless motor according to this invention consists in a drive method for a brushless motor wherein a motor current value of the brushless motor is controlled by a drive circuit which calculates control parameters in accordance with a deviation between a target motor current value and an actual motor current value and which performs drive of PWM on the basis of the calculated control parameters, and wherein a conduction phase angle of the drive circuit is controlled on the basis of a motor current signal of a motor current detection sensor which detects the motor current value of the brushless motor; comprising the steps of computing a manipulated variable on the basis of the calculated control parameters, computing an advance angle magnitude from a corresponding relationship between a manipulated variable and an advance angle as designed and created beforehand, on the basis of the computed manipulated variable, and correcting a value of the conduction phase angle of the drive circuit as set on the basis of the motor current signal, with information of the computed advance angle magnitude.

Besides, a drive control apparatus for a brushless motor according to this invention consists in a drive control apparatus for a brushless motor wherein control parameters are calculated by motor current control means in accordance with a deviation between a target motor current value and an actual motor current value, a drive circuit is controlled by control means of PWM on the basis of the calculated control parameters, so as to control the motor current value of the brushless motor, and a conduction phase angle of the drive circuit is controlled on the basis of a motor current signal of a motor current detection sensor which detects the motor current value of the brushless motor; comprising phase control means for computing an advance angle magnitude on the basis of the control parameters calculated by the motor current control means, and for applying the computed advance angle information to the PWM control means, the PWM control means correcting the conduction phase angle of the drive circuit set on the basis of the motor current signal, on the basis of the information from the phase control means.

According to this invention, there are provided a drive method for a brushless motor and a drive control apparatus therefor in which, especially in the low-speed revolution region and high-load region of the brushless motor, an efficiency is high, and a consumption current can be decreased.

Moreover, there are provided a drive method for a brushless motor and a drive control apparatus therefor, which are well suited for application to a hydraulic type power steering system employing the brushless motor.

DETAILED DESCRIPTION OF THE INVENTION

Embodiment 1

Figure 1:
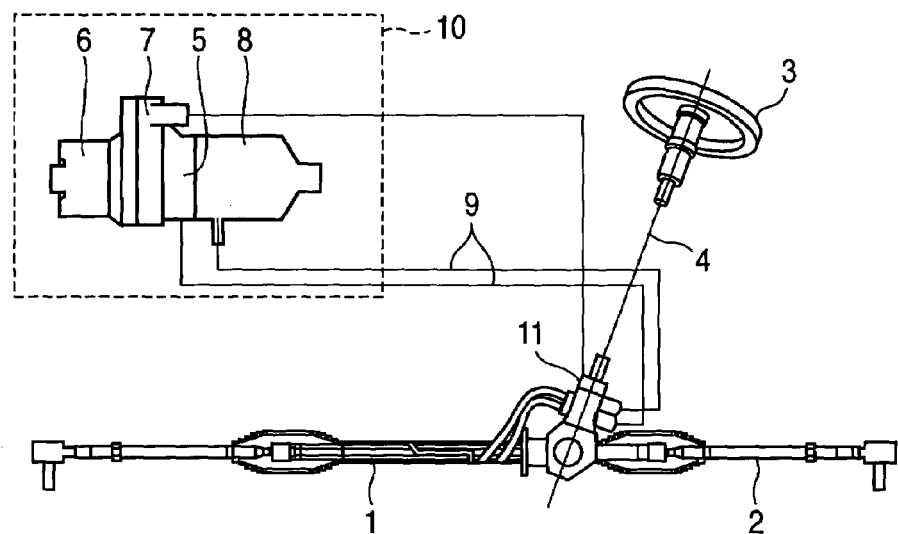
FIG. 1 is a configurational view of a hydraulic power steering control system including an electrically-operated pump, to which this invention is applied.

In general, the control of a motor subjects drive transistors to PWM drive so as to zeroize the deviation between a set target motor revolution number and an actual revolution number. Usually, a PID control (where P denotes a proportion control, I denotes an integration control, and D denotes a differentiation control) is performed in accordance with the deviation. With only the PID control, however, the conduction phase angle of a motor drive circuit becomes constant. In order to solve the problems of the prior art as stated above, therefore, the conduction phase angle needs to be controlled using any means.

In this invention, the conduction phase angle is controlled using control parameters obtained on the basis of the deviation between a target motor current value and an actual motor current value, that is, a P term (proportion term), an I term (integration term) and a D term (differentiation term), whereby a motor efficiency is heightened especially in a low-speed revolution region and a high-load region.

Now, a drive method for a brushless motor and a drive control apparatus therefor in Embodiment 1 of this invention will be described with reference to FIGS. 1 through 5. Incidentally, throughout the drawings, the same reference numerals indicate identical or corresponding parts.

FIG. 1 is a view showing the configuration of a hydraulic type power steering control system which employs a brushless motor for driving an electrically-operated pump, and to which this invention is applied.

Referring to FIG. 1, numeral 1 designates a steering gear, numeral 2 tie rods, numeral 3 a steering handle, numeral 4 a steering shaft, numeral 5 the oil pump, numeral 6 the DC brushless motor, numeral 7 a controller, numeral 8 an oil tank, numeral 9 hydraulic pipes, and numeral 10 an oil pump section.

Figure 2:
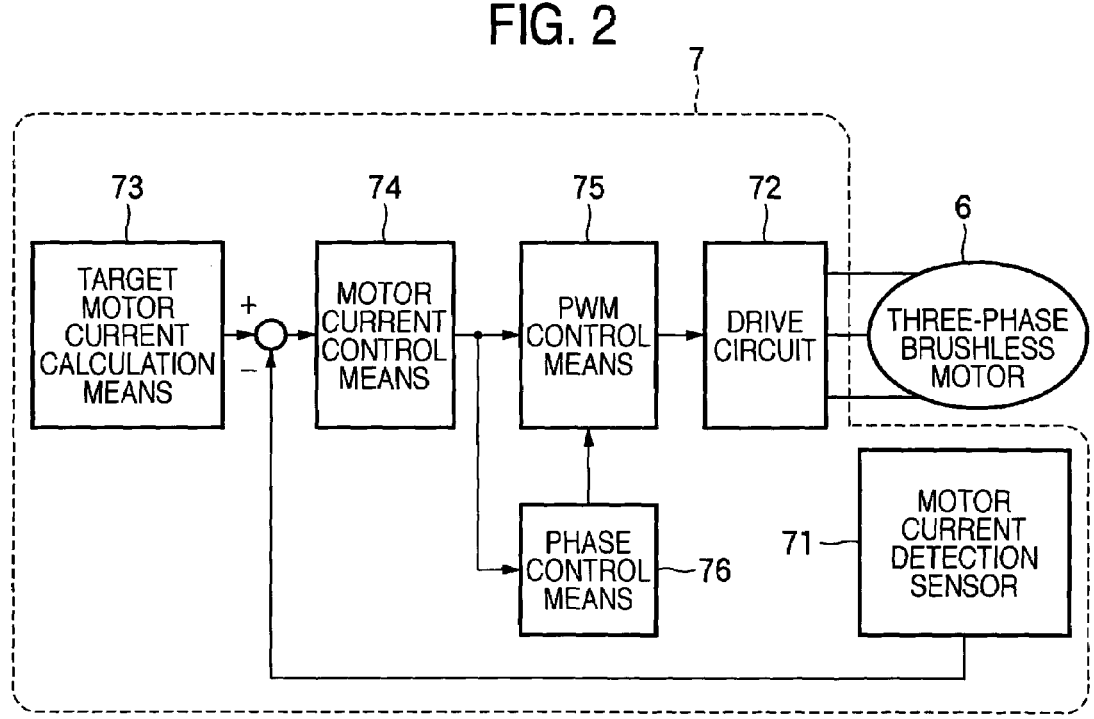
FIG. 2 is a control block diagram of a drive control apparatus for a brushless motor, in Embodiment 1 of this invention.

FIG. 2 is a control block diagram of the controller 7 which performs the drive control of the brushless motor 6. Referring to FIG. 2, numeral 71 designates a motor current detection sensor, numeral 72 a drive circuit, numeral 73 target motor current calculation means, numeral 74 motor current control means, numeral 75 PWM control means, and numeral 76 phase control means.

Figure 3:
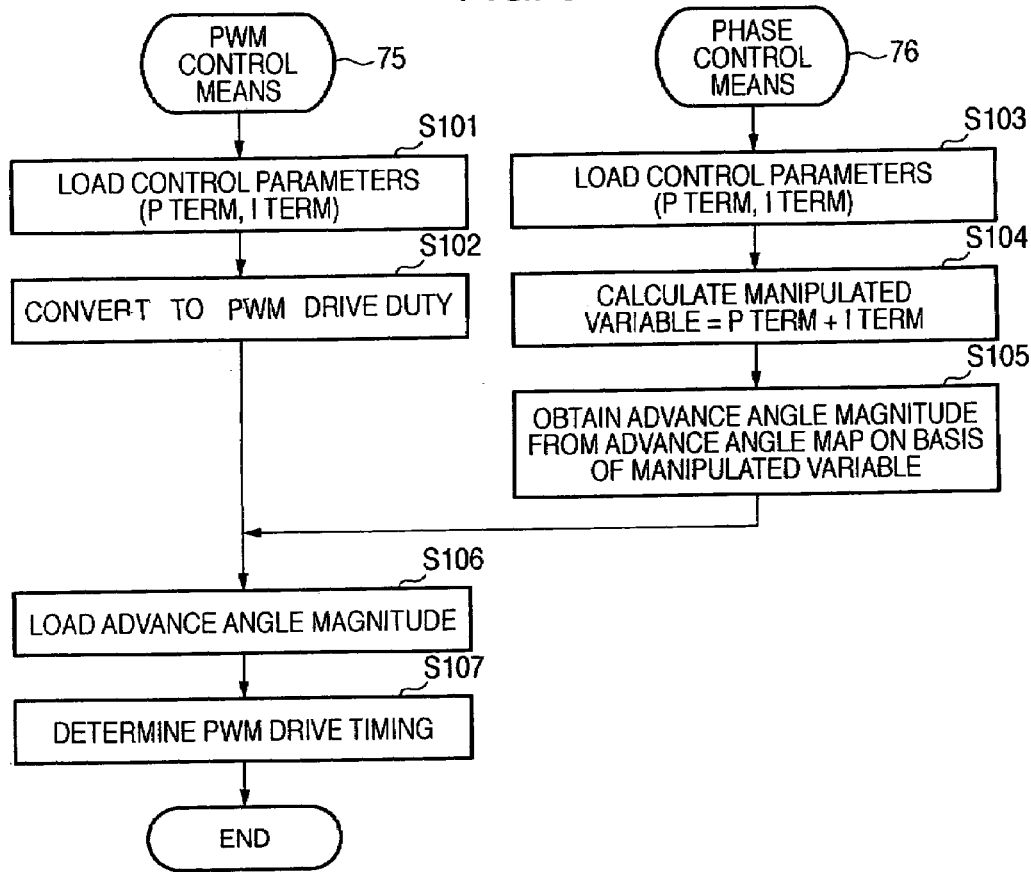
FIG. 3 is a control flow chart for explaining the operations of phase control means and PWM control means in Embodiment 1 of this invention.

FIG. 3 is a control flow chart for explaining the operations of the PWM control means 75 and the phase control means 76. In FIG. 3, signs S101 through S107 indicate the respective steps of a control flow.

Figure 4:
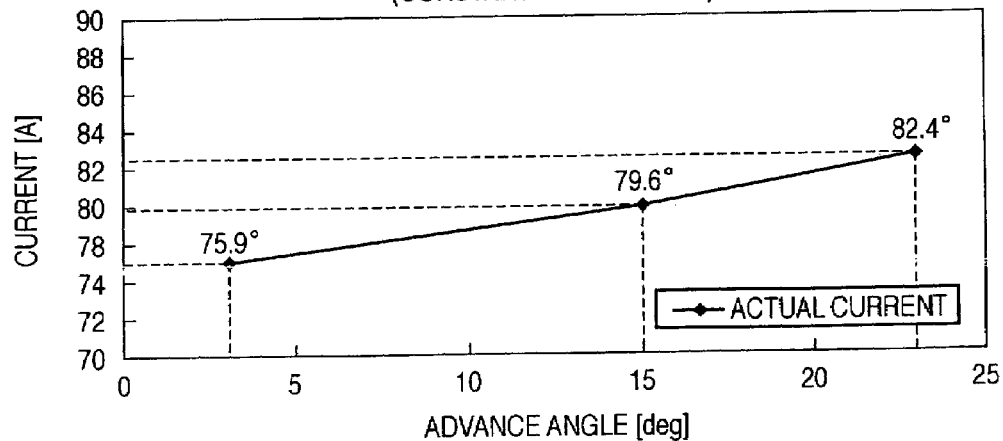
FIG. 4 is a graph showing the relationship between an advance angle and a current in order to explain an operating principle in Embodiment 1 of this invention.

FIG. 4 is a graph showing the relationship between an advance angle and a current in order to explain an operating principle in Embodiment 1 of this invention.

Figure 5:
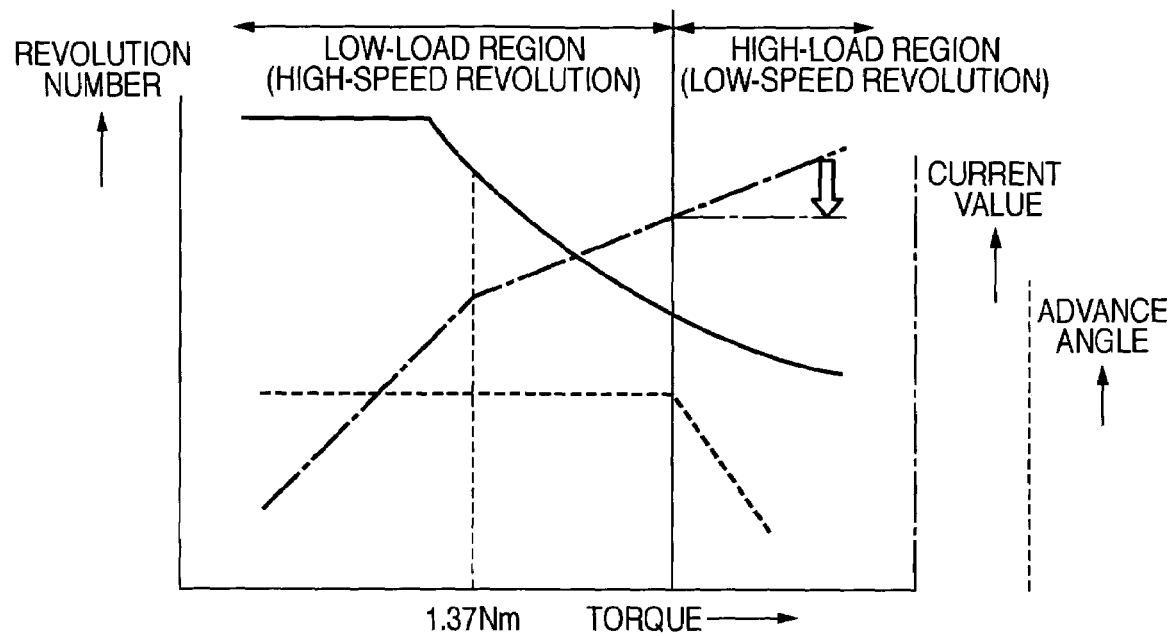
FIG. 5 is a conceptual diagram for explaining the advantages of Embodiment 1 of this invention.

FIG. 5 is a conceptual diagram for explaining the advantages of Embodiment 1 of this invention.

As shown in FIG. 1, the steering gear 1 is provided with the tie rods 2 which are connected through knuckle arms to the right and left steering wheels of an automobile or the like vehicle not shown. As is well known, the steering gear 1 includes a flow path changeover valve which changes-over hydraulic flow paths in such a way that the steering manipulation of the steering handle 3 is transmitted thereto by the steering shaft 4, a transmission section which transmits the steering manipulation onto the side of the tie rods 2, and a power cylinder which generates an assist force corresponding to the steering manipulation, by introducing a hydraulic pressure into either of the right and left chambers thereof.

Besides, the oil pump section 10 is driven by the electrically-operated motor 6 so as to feed a pressurized oil to the steering gear 1 through either of the hydraulic pipes 9. This oil pump section 10 is configured of the oil pump 5, the DC brushless motor 6 which is the electrically-operated motor for driving the pump 5, the oil tank 8 which is made of a casing covering the periphery of the pump 5, and the controller 7 which optimally controls the electrically-operated motor.

Besides, as shown in FIG. 2, the DC brushless motor 6 is a three-phase motor, and it is subjected to PWM drive by the drive circuit 72 which includes six power transistors not shown.

The target motor current calculation means 73 calculates the target motor current value of the DC brushless motor 6 as is aimed at and as is stored in a memory beforehand.

On the other hand, the actual motor current value of the DC brushless motor 6 is detected by the motor current detection sensor 71. The detected motor current signal from the motor current detection sensor 71 is compared with the target motor current value calculated by the target motor current calculation means 73, and the deviation between the actual and target motor current values is inputted to the motor current control means 74.

Then, the motor current control means 74 and the PWM control means 75 operate as follows: When the actual motor current value has been fed back, the motor current control means 74 calculates control parameters, such as a proportion term and an integration term, based on the deviation between the actual motor current value and the target motor current value, and the PWM control means 75 calculates a PWM drive duty from the result of the parameter calculation.

Further, the optimum conduction phase angle of the drive circuit 72 is calculated by the phase control means 76 on the basis of the control parameters such as the proportion term, the integration term and a differentiation term based on the deviation as obtained by the motor current control means 74, and the result of the calculation is reflected on the PWM control means 75.

FIG. 4 shows the relationship between the conduction phase angle (PWM drive timing) and the motor current in the brushless motor. When the conduction phase angle is changed by driving the brushless motor at a constant PWM drive duty of 100%, the motor current value becomes larger with the advance angle as shown in FIG. 4.

On the other hand, in that high-load region of the brushless motor in which the load torque thereof exceeds the motor output thereof, a current feedback control needs to be performed so that the motor current value may not exceed its rated value. In this regard, it is permitted to control the motor current by changing the conduction phase angle without changing a PWM drive duty. Here, the "drive duty" is the conduction factor of a motor drive circuit as converted from the control parameters, such as the proportion, integration and differentiation terms, based on the deviation between the target current value and the actual current value in the motor current control.

Next, the operations of the phase control means 76 and PWM control means 75 will be described with reference to FIG. 3. The steps S101 through S107 proceed as shown in FIG. 3:

(1) At the step S101, the PWM control means 75 loads thereinto control parameters (proportion term: P term, and integration term: I term) calculated by the motor current control means 74.

(2) At the step S102, the PWM control means 75 calculates a PWM drive duty on the basis of the control parameters loaded at the step S101.

(3) On the other hand, the phase control means 76 loads thereinto the control parameters at the step S103, in the same manner as at the step S101.

(4) At the step S104, the phase control means 76 calculates a manipulated variable on the basis of the control parameters. In Embodiment 1, the manipulated variable is the sum of the proportion term (P term) and the integration term (I term).

(5) At the step S105, the phase control means 76 obtains an advance angle magnitude on the basis of the manipulated variable, from an advance angle map which has been created beforehand and which is held stored in the unshown memory of the controller 7.

(6) At the step S106, the PWM control means 75 loads thereinto the advance angle magnitude obtained at the step S105.

(7) At the step S107, the PWM control means 75 calculates a conduction phase angle on the basis of the loaded advance angle magnitude.

Incidentally, although the manipulated variable is set at the sum of the proportion term (P term) and integration term (I term) of the control parameters at the step S104, the remaining differentiation term (D term) may well be added.

Besides, it is a matter of course that the manipulated variable need not always be set at the sum of the terms, but that it can be calculated on the basis of the terms multiplied by coefficients or the product of the terms.

Meanwhile, FIG. 5 is the conceptual diagram for explaining the advantages of this invention. In the low-speed revolution region of the brushless motor 6, the motor drive is set so as to decrease the advance angle from a stage at which a predetermined high load is exceeded and at which the advance angle holds a constant value, whereby the rise of the motor current value is suppressed.

As described above, the drive method and the drive control apparatus for a brushless motor according to Embodiment 1 of this invention consist in that, in addition to the prior-art conduction phase angle control of a drive circuit as based on the rotation position signal of a rotation position detection sensor, a manipulated variable is calculated using control parameters, namely, a proportion term (P term), an integration term (I term) and a differentiation term (D term), obtained from the deviation between a target motor current value and an actual motor current value, whereupon an advance angle magnitude is calculated from the relationship between a manipulated variable and an advance angle magnitude as designed and created beforehand, on the basis of the calculated manipulated variable, thereby to determine a conduction phase angle, and that a conduction phase angle set on the basis of the rotation position signal is corrected on the basis of the information of the calculated advance angle magnitude, namely, conduction phase angle.

Accordingly, especially in the low-speed revolution region and high-load region of the brushless motor, the conduction phase angle, namely, PWM drive timing of the drive circuit can be controlled, and the motor current of the brushless motor is controlled by delaying the advance angle of motor rotation, whereby the efficiency of the motor can be enhanced to realize the decrease of a consumption current.

Besides, the drive duty of the drive circuit is calculated on the basis of the calculated control parameters, and the motor drive is controlled so that, when the calculated drive duty is, at least, a predetermined value as designed, the value of the conduction phase angle of the drive circuit may be corrected. Therefore, especially in the low-speed revolution region and high-load region, the motor current can be controlled by delaying the advance angle, and a region in which the PWM drive duty can be set at the predetermined value (100%) or above is expanded, whereby a switching loss can be relieved to attain a high efficiency and to decrease the consumption current.

Moreover, since the drive method and drive control apparatus for the brushless motor according to this invention can be incorporated into a hydraulic power steering control system employing the brushless motor for driving an electrically-operated pump, the hydraulic type power steering control system which is suited to assist a vehicle driver in handle manipulation can be realized at a low fuel consumption.

Although this invention has been described above in detail in connection with Embodiment 1, various changes and modifications are apparent to those skilled in the art, and they shall be covered within the scope of the invention.

What is claimed is:

1. A drive method for a brushless motor wherein a motor current value of the brushless motor is controlled by a drive circuit which calculates control parameters in accordance with a deviation between a target motor current value and an actual motor current value and which performs drive of PWM on the basis of the calculated control parameters, and wherein a conduction phase angle of the drive circuit is controlled on the basis of a motor current signal of a motor current detection sensor which detects the motor current value of the brushless motor; comprising the steps of computing a manipulated variable on the basis of the calculated control parameters, computing an advance angle magnitude from a corresponding relationship between a manipulated variable and an advance angle as designed and created beforehand, on the basis of the computed manipulated variable, and correcting a value of the conduction phase angle of the drive circuit as set on the basis of the motor current signal, with information of the computed advance angle magnitude.

2. A drive method for a brushless motor as defined in claim 1, wherein the manipulated variable is computed using at least one member selected from the group consisting of a proportion term for a proportional control, an integration term for an integral control and a differentiation term for a differential control, as are the control parameters.

3. A drive method for a brushless motor as defined in claim 1, wherein the manipulated variable is computed using a proportion term for a proportional control, an integration term for an integral control and a differentiation term for a differential control, as are the control parameters.

4. A drive method for a brushless motor as defined in claim 1, wherein a drive duty of the drive circuit is computed on the basis of the control parameters, and the value of the conduction phase angle of the drive circuit is corrected in a case where the computed drive duty is, at least, a predetermined value.

5. A drive control apparatus for a brushless motor wherein control parameters are calculated by motor current control means in accordance with a deviation between a target motor current value and an actual motor current value, a drive circuit is controlled by control means of PWM on the basis of the calculated control parameters, so as to control the motor current value of the brushless motor, and a conduction phase angle of the drive circuit is controlled on the basis of a motor current signal of a motor current detection sensor which detects the motor current value of the brushless motor; comprising phase control means for computing an advance angle magnitude on the basis of the control parameters calculated by said motor current control means, and for applying the computed advance angle information to the PWM control means, said PWM control means correcting the conduction phase angle of said drive circuit set on the basis of the motor current signal, on the basis of the information from said phase control means.

6. A drive control apparatus for a brushless motor as defined in claim 5, wherein said phase control means computes the advance angle magnitude by using at least one member selected from the group consisting of a proportion term for a proportional control, an integration term for an integral control and a differentiation term for a differential control, as are the control parameters.

7. A drive control apparatus for a brushless motor as defined in claim 5, wherein said phase control means computes the advance angle magnitude by using a proportion term for a proportional control, an integration term for an integral control and a differentiation term for a differential control, as are the control parameters.

8. A drive control apparatus for a brushless motor as defined in claim 5, wherein said PWM control means computes a drive duty of said drive circuit on the basis of the control parameters, and the value of the conduction phase angle of said drive circuit is corrected in a case where the computed drive duty is, at least, a predetermined value as designed.

9. A hydraulic type power steering control system comprising the drive control apparatus as defined in claim 5, for the brushless motor for driving a hydraulic pump.

* * * * *